(12) United States Patent
Yianni et al.

(10) Patent No.: US 9,049,757 B2
(45) Date of Patent: Jun. 2, 2015

(54) LIGHT SOURCE SELECTION

(75) Inventors: George Frederic Yianni, Eindhoven (NL); Jacob Cornelis Paul Den Dulk, Eindhoven (NL); Hendricus Theodorus Gerardus Maria Penning De Vries, Mierlo (NL); Lucius Theodorus Vinkenvleugel, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 237 days.

(21) Appl. No.: 13/634,602

(22) PCT Filed: Mar. 11, 2011

(86) PCT No.: PCT/IB2011/051028
§ 371 (c)(1),
(2), (4) Date: Sep. 13, 2012

(87) PCT Pub. No.: WO2011/114269
PCT Pub. Date: Sep. 22, 2011

(65) Prior Publication Data
US 2013/0009036 A1    Jan. 10, 2013

(30) Foreign Application Priority Data
Mar. 19, 2010    (EP) ..................................... 10156995

(51) Int. Cl.
*G01J 1/44*        (2006.01)
*H05B 37/02*       (2006.01)
*G08C 23/04*       (2006.01)
*H04L 29/12*       (2006.01)

(52) U.S. Cl.
CPC ............ *H05B 37/0272* (2013.01); *H05B 37/02* (2013.01); *G08C 23/04* (2013.01); *G08C 2201/71* (2013.01); *H04L 29/12254* (2013.01); *H04L 61/2038* (2013.01)

(58) Field of Classification Search
CPC ......... H05B 37/02; H04L 29/12; G08C 19/28
USPC ........................................ 250/216, 208.1, 205
See application file for complete search history.

(56) References Cited

U.S. PATENT DOCUMENTS

2002/0043938 A1\* 4/2002 Lys ................................ 315/149
2002/0100875 A1   8/2002 Greene

FOREIGN PATENT DOCUMENTS

DE    4327173 A1    2/1995
EP    1164366 A2   12/2001
WO   2005031675 A1    4/2005

(Continued)

*Primary Examiner* — Tony Ko
(74) *Attorney, Agent, or Firm* — Meenakshy Chakravorty

(57) ABSTRACT

The invention relates to selecting a light source from a plurality of light sources, particularly to the selecting of a light source by pointing to it with a light source selection device. An embodiment of the invention relates to a light source selection device (10) comprising—at least one photosensor (36, 38, 40) with a field of view (20, 22, 24), wherein light (26, 28, 30) from one or more light sources (32, 34) may be received by the photosensor within the field of view, and—a photosensor output signal processing unit (42) being adapted to select one or more light sources by processing the light received by each photosensor. The present invention may be for example used to select appliances or devices or objects provided with the ability to transmit coded light in the ultra violet, visible or infra red spectra, for example lights, climate, curtains, kitchenware, etc.

12 Claims, 6 Drawing Sheets

(56) References Cited

FOREIGN PATENT DOCUMENTS

| WO | 2006111927 | A1 | 10/2006 |
| WO | 2006111930 | A2 | 10/2006 |
| WO | 2007095740 | A1 | 8/2007 |
| WO | 2008059411 | A1 | 5/2008 |
| WO | 2009122357 | A1 | 10/2009 |
| WO | 2009153688 | A1 | 12/2009 |
| WO | 2010150131 | A1 | 12/2010 |

* cited by examiner

LIGHT SOURCE SELECTION

TECHNICAL FIELD

The invention relates to selecting a light source from a plurality of light sources, particularly to the selecting of a light source by pointing to it with a light source selection device.

BACKGROUND ART

Remote controls with IR (Infrared) transmitters are common to select functions for TV's, DVD players, video recorders, etc. Each of these devices has usually it's own remote control, which is provided to transmit commands via IR signals to the respective device.

In the field of lighting control of complex lighting systems with dozens of light sources, there are often many individual light points or sources which can be individually controlled. With such systems, it is inconvenient to have an individual remote control for each light point. The current state of the art is a single controller where each light source has its own button (either physically or through menus). However, this kind of control rapidly becomes inconvenient as the number of lights increases.

WO2009/122357A1 describes a controllable light angle selecting device, which comprises a fixed light selecting means adapted to transmit light incident thereon within a limited acceptance angle, optically connected to at least one light redirecting means capable of obtaining a variable angular difference between light entering said light redirecting means and light exiting said light redirecting means. A photometer, comprising a controllable light angle selector arranged in the path of light between a light source and a light measuring sensor is also provided.

SUMMARY OF THE INVENTION

It is an object of the invention to provide a light source selection device, with which a light source may be selected by pointing to it.

The object is solved by the subject matter of the independent claims. Further embodiments are shown by the dependent claims.

A basic idea of the invention is to use one or more photosensors with different fields of view and to select a light source by processing the output signals of the photosensors, particularly with an algorithm adapted to process the photosensor output signals. A field of view of a photosensor is the angular area it is sensitive to, i.e. light incident within the field of view causes an output signal of the photosensor, which is suitable for further processing, while light outside the field of view will be either not detected by the photosensor or does not contribute to an output signal of the photosensor in a way suitable for further processing, for example a weak signal. The output signal of the photosensor may be analyzed by a processing unit, which may perform a light source selection algorithm. The processing unit may distinguish light incident within the field of view and received from different light sources, and select one or more light sources based on various selection schemes, for example based on the signal strength of the photosensor output signal generated by light received from a certain light source. It should be noted that in the scope of the present invention, light received and processed for light source selection comprises radiation within the ultra violet, visible and/or infra red spectra. The present invention may be for example used to select appliances or devices or objects provided with the ability to transmit coded light in the ultra violet, visible or infra red spectra, for example lights, climate, curtains, kitchenware, etc. After selection, the selected device, appliance or object can be edited at distance, e.g. by the use of a remote control, in which the invention may be integrated.

An embodiment of the invention provides a light source selection device comprising at least one photosensor with a field of view, wherein light from one or more light sources may be received by the photosensor within the field of view, and a photosensor output signal processing unit being adapted to select one or more light sources by processing the light received by each photosensor.

Light from different light sources may be distinguished for example by identifications of the light sources contained in the light (coded light), by the frequency range of received light, or a certain modulation scheme of the light emitted from a light source.

The device may further comprise light selecting means, which comprise at least one tunnel, wherein a tunnel is adapted for defining a field of view and for transmitting light from one or more light sources incident on one end of the tunnel within the field of view to a photosensor arranged on the other end of the tunnel. The light selecting means are the optical part of the device, while the photosensors and photosensor output signal processing unit is the electronic and software part.

The photosensor output signal processing unit may be adapted to process the received light by determining different light sources through decoding identifiers contained in the received light, and selecting one or more light sources from the determined different light source.

For selecting a light source various selection schemes may be applied according to the invention.

The photosensor output signal processing unit may be adapted to select one or more light sources by determining the signal strength of the light received from the determined different light sources, and selecting one or more light sources depending on the determined signal strengths.

Particularly, the photosensor output signal processing unit is adapted to select one or more light sources with the largest signal strengths among the determined signal strengths.

In another embodiment, the photosensor output signal processing unit may be adapted to select a light source by determining the signal strength of the light received from a light source by a first one of the photosensors, for example one with smallest field of view, checking if the determined signal strength exceeds a threshold or has a threshold lead on other signal strengths, repeating the above steps for the next one of the photosensors if the determined signal strength does not exceed the threshold or selecting the light source if the determined signal strength exceeds the threshold.

In yet another embodiment, the photosensor output signal processing unit may be adapted to select a light source by determining the signal strength of the light received from a light source by each photosensor, repeating the above step for each of the determined different light sources, and selecting the light source for which the largest signal strength is determined.

In yet another embodiment, the photosensor output signal processing unit may be adapted to select a light source by determining the signal strength of the light received from a light source by each photosensor, fitting the determined signal strengths to a distribution of a signal strength, estimating the offset of the light source from a pointing direction of the device, repeating the above steps for each of the determined different light sources, and selecting the light source with the smallest estimated offset from the pointing direction.

The device may further comprise one or more of the following:

a RF unit being adapted to transmit an identification of a selected light source a RF unit being adapted to request lights to transmit its identification;

a display for displaying a selected light source;

buttons for selecting one of several selected light sources;

a laser pointing unit for aiding a user in selecting a light source.

A further embodiment of the invention relates to light selecting means being adapted for a device of the invention and as described above and comprising at least one tunnel and photosensors assigned to each tunnel, wherein each tunnel is adapted for defining a field of view and for transmitting light from one or more light sources incident on one end of the tunnel within the field of view to one of the photosensors being arranged on the other end of the tunnel, and wherein the fields of view of the tunnels differ from each other.

In an embodiment, the means may comprise a first tunnel having a first length determining a first field of view, a second tunnel having a second length being larger than the first length and determining a second field of view, a third tunnel having a third length being larger than the second length and determining a third field of view, and wherein the first, second, and third fields of view differ from each other in their view angles.

A tunnel may be formed by means of a light guiding core with a light absorbing casing or a light guide.

Another embodiment of the invention relates to light means being adapted for a device of the invention and as described above and implementing a field of view restriction for one or more photosensors by means of a carbon nanotube sheet, particularly a thin sheet of aligned carbon nanotubes. A thin sheet of aligned carbon nanotubes would allow the field of view of the light selecting means to be determined in a thin form factor unlike a tunnel.

A further embodiment of the invention relates to a light source selection system comprising a light source selection device of the invention and as described above and a lighting system controller being adapted to receive information related to a selected light source from the light source selection device and to control the selected light source.

These and other aspects of the invention will be apparent from and elucidated with reference to the embodiments described hereinafter.

The invention will be described in more detail hereinafter with reference to exemplary embodiments. However, the invention is not limited to these exemplary embodiments.

DESCRIPTION OF EMBODIMENTS

Figure 1:
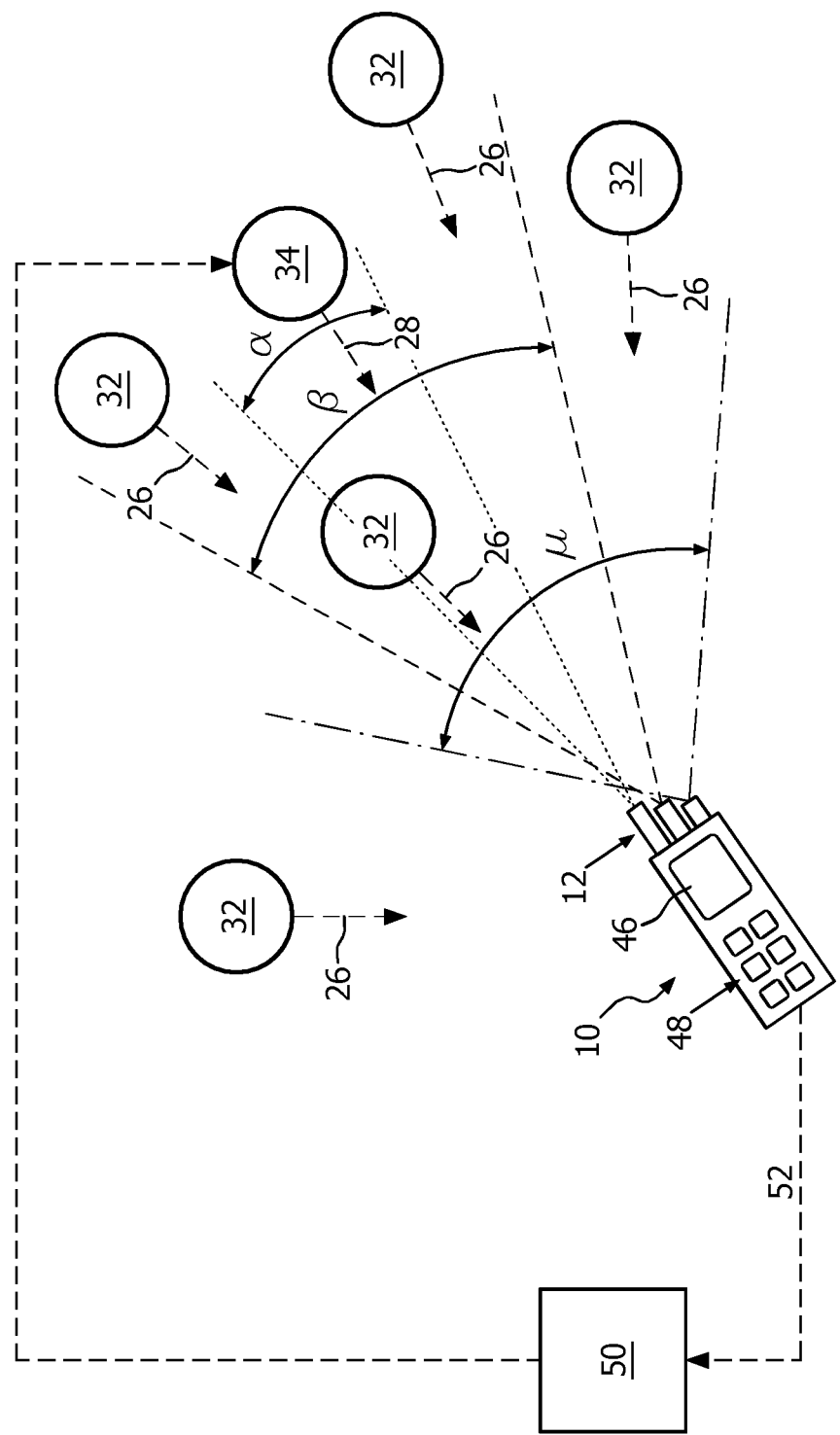
FIG. 1 shows an application of the light source selection device according to the invention for selecting lamps of a lighting system.

In the following, functionally similar or identical elements may have the same reference numerals. The terms "lamp", "light" and "luminary" describe the same.

Even if the following embodiments of the invention relate to the controlling of lighting systems with dozens of individually selectable and controllable lamps, the invention can be applied to select other devices e.g. blinds, TV, HVAC etc.

The invention allows to create a highly directional pointing remote control device, which makes it possible to have a single remote control that can intuitively point to and select the lamp which a user wants to control.

The invention is for the optical part and selection algorithm of a larger system for controlling a plurality of devices.

The complete system contains the following elements:
1. Selectable devices. These devices can
    be remotely controlled by the control device over a wired or wireless communication channel,
    on request of the control devices (or constantly) transmit their an identifier over an infra red, visible or ultraviolet light channel.
2. A control device. This is typically a hand held wireless device which can be used to point at the selectable devices. This device can
    point to a selectable device and then determine which out of the plurality of devices it is pointing at,
    send commands to modify the state of the selected device.

FIG. 1 shows an embodiment of a lighting system and the application of the inventive light source selection as remote control device for selecting and controlling different lamps of the lighting system. FIG. 1 shows a hand held light source selection device 10, which comprises light selection means 12, a display 46, and several buttons 48, and a lighting system with several lamps 32 and 34 and a lighting system controller 50 for controlling the lamps 32 and 34. The lighting system controller 50 comprises a wireless or wired communication module for receiving information from the light source selection device 10, which also comprises a wireless or wired communication module, via a wireless or wired communication link. The wireless communication link may be for example established with a RF (Radio Frequency), IR (Infra Red), visible light or UV (Ultra Violet) communication technology.

The lamps 32 and 34 of the lighting system are adapted to emit coded light, for example a lamp may comprise a light modulation module for modulating emitted light with a unique code or an IR transmitter, which may emit a unique code of the lamp. For emitting coded light techniques known in prior art may be used. Coded light may be emitted in the range from infra red over visible to ultra violet. The unique codes of the lamps 32 and 34 may either preinstalled or may be assigned by the lighting system controller 50 to the lamps 32 and 34, for example when the lighting system is installed. The unique codes may be continuously broadcast by the lamps 32 and 34, or on request be the light system controller 50 or the light source selection device 10. For example, a user may request the emitting of coded light by pressing a button 48 of the device 10. This may cause the device 10 to transmit a command to the lighting system controller 50, which then controls the lamps 32 and 34 to emit their unique codes.

The selection of a lamp 32 with the light source selection device 10 may be performed by a user as follows: the user points with the device 10 to the lamp 32 to be selected, particularly directs the lighting selection means 12 to the lamp 34. Then, the user may request the emission of coded light by pressing a button 48. Alternatively the lamps could always be transmitting coded light rendering this step unnecessary. The lighting selection means 12 comprise three different fields of view represented by the three different angles of the detection ranges of the photosensors contained in the device 10, refer to FIGS. 2-4. Thus, the first photosensor with the angle $\alpha$ of detection receives coded light from lamp 34 and one lamp 32, the second photosensor with the angle $\beta$ of detection receives coded light from lamp 34 and three lamps 32, and the third photosensor with the largest angle $\mu$ of detection receives coded light from lamp 34 and four lamps 32. The photosensor output signals are processed inside the light source selection device 10, particularly with a controller 42 as shown in FIG. 3.

The device 10 receives light from plurality of lamps 32 and 34 at the photosensors inside the device 10, each of which have different fields of view and hence receive different contributions from the lamps 32 and 34. An algorithm for processing the signals of the photosensors typically performs the following steps:
1. The signal from each photosensor is filtered to leave only the information relevant to identifying the lamps.
2. The identifiers of each lamp are disentangled and processed leaving a list of the received strengths of the signal from each lamp per photosensor.
3. This list is fed through an selection algorithm which then makes a selection for which lamp is most likely pointed at.

The light source selection device 10 comprises an optical part and an electronic part for executing the above selection algorithm.

Figure 2:
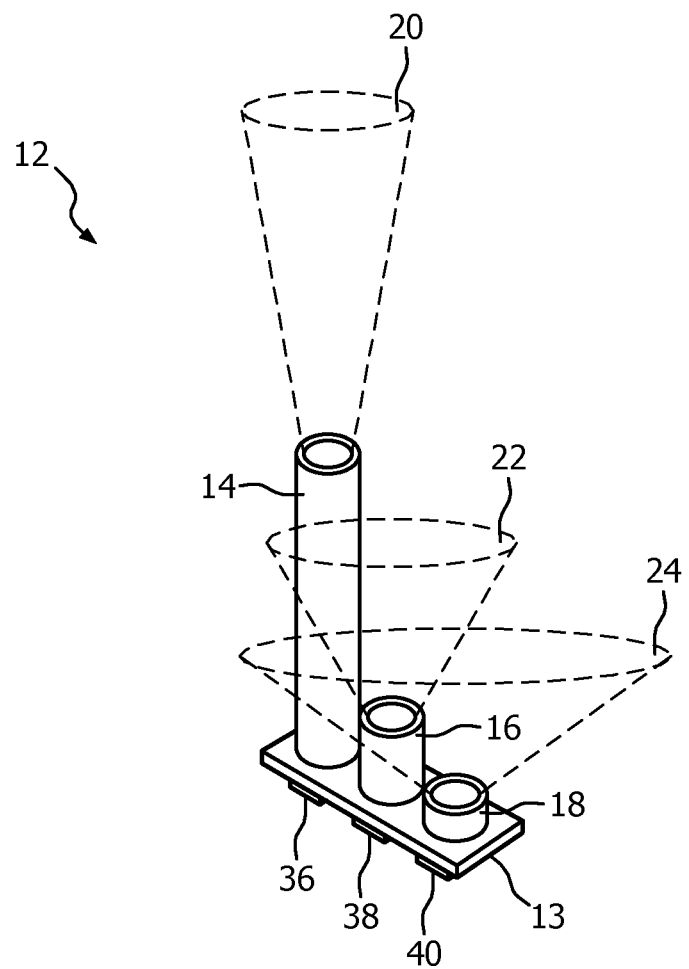
FIG. 2 shows an embodiment of light selecting means with three pipes according to the invention.
Figure 3:
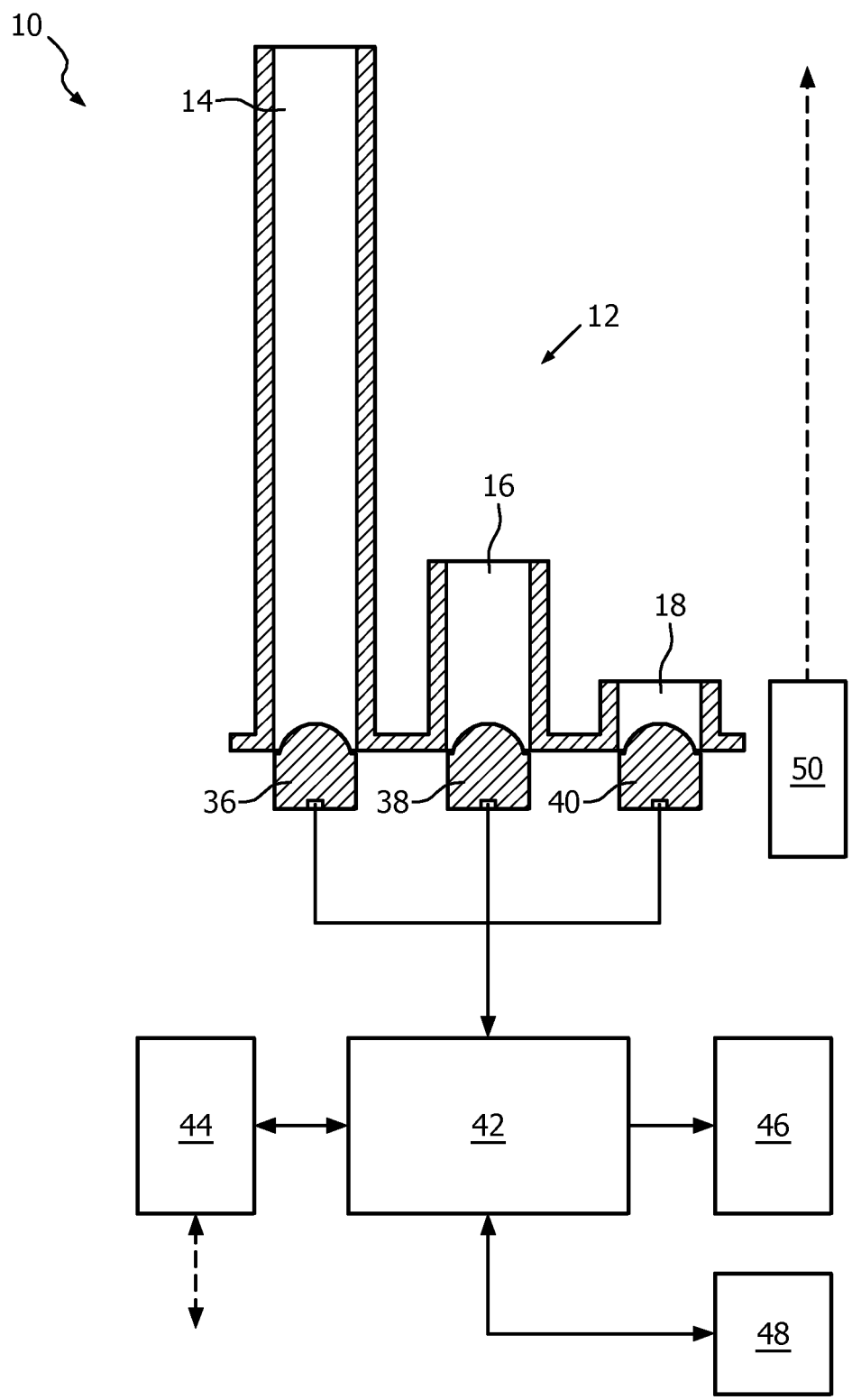
FIG. 3 shows an embodiment of the light source selection device according to the invention, which comprises the light selection means of FIG. 1 and shows a block diagram of the electronic part.

FIG. 2 shows an embodiment of the optical part, which serves as the light selection means 12 of the present invention. The main feature of the means 12 is that there is a photosensor with a small field of view (view angle $\alpha$), a photosensor with an intermediate field of view (view angle $\beta$) and a photosensor with a large field of view (view angle $\mu$). The exact sizes of these few angles can be from 0 degrees to 360 degrees (opening angle) although a typical value would be (4, 10, 30 degrees for $\alpha$, $\beta$, $\mu$ respectively). The photosensors are implemented by photodiodes with pipes or tubes defining the fields of view: in the embodiment shown in FIG. 2, the means 12 comprise three different pipes or tubes 14, 16, and 18, which are arranged in parallel with one end on a carrier plate 13 and serve as tunnels for incident light defining different fields of view. The plate 13 also contains photodiodes 36, 38, 40. Each photodiode 36, 38, and 40 is assigned to a pipe 14, 16, and 18, respectively. The photodiodes 36, 38, 40 are mounted on the carrier plate 13 such that their light sensitive area is completely covered by an end of the respective pipe 14, 16, or 18. Light incident on the other ends of the pipes 14, 16, and 18 can be at least partly transmitted to the light sensitive areas of the photodiodes 36, 38, or 40, respectively. The length of each pipe 14, 16, and 18 defines the field of view 20, 22, and 24, respectively. The fields of view differ in their angle of detection of incident light or view angles: the long pipe 14 has a small view angle $\alpha$, while the shortest pipe 18 has the widest view angle $\mu$, so that the assigned photodiode 40 can receive light from all lamps or light sources incident on the pipe 18 within the angle $\mu$, of detection.

A tunnel for incident light can be formed by means of a light guiding core with a light absorbing casing. The light guiding core may be of any material, which has good light guiding characteristics. A tunnel may be for example implemented by a pipe made of a material, which blocks and absorbs light. The pipe may be merely filled with air. The restricted field of view may also be implemented by a sheet of aligned carbon nanotubes with size of field of view determined by the thickness vs length of the individual tubes. This allows the field of view to be controlled in a thin form factor. The object of a tunnel is to transmit only light incident on an end of the tunnel from light sources positioned within the defined angle of detection or field of view to the other end of the tunnel, where a photosensor is positioned, and to block light from light sources positioned outside the field of view.

Figure 6:
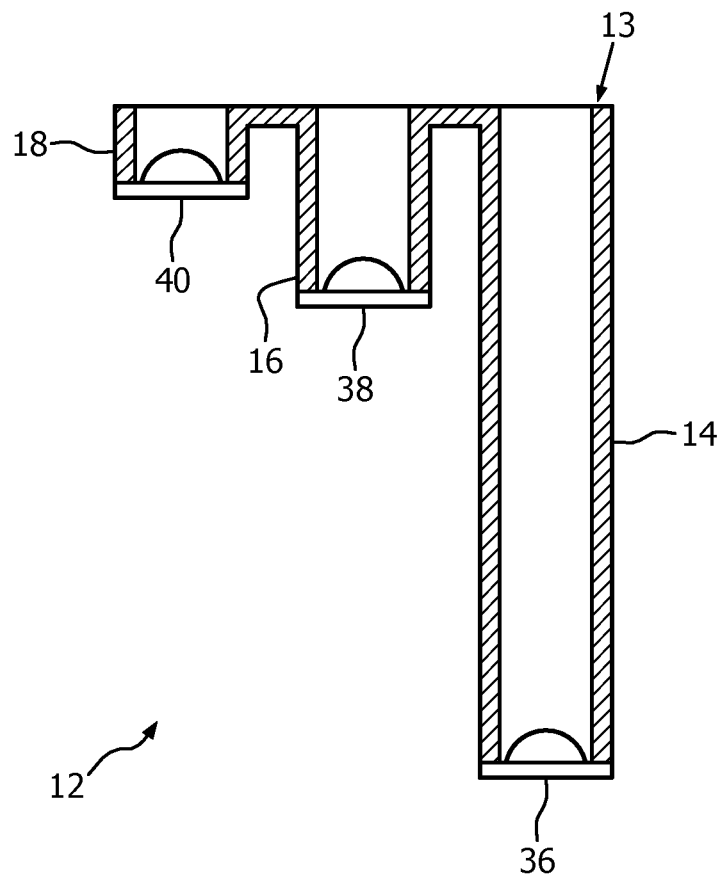
FIG. 6 shows a further embodiment of light selecting means with three pipes according to the invention.

A further embodiment of the lighting selecting means 12 of the present invention is shown in FIG. 6. The main difference of this embodiment to the embodiment shown in FIG. 2 is that the flat top surface 13 so that no shadow of other pipes appear, and each pipe 14, 16, and 18 has a free view. The photodiodes 36, 38, and 40 are fixed at the end of the pipes 14, 16, and 18, respectively, as is shown in FIG. 6.

Figure 7:
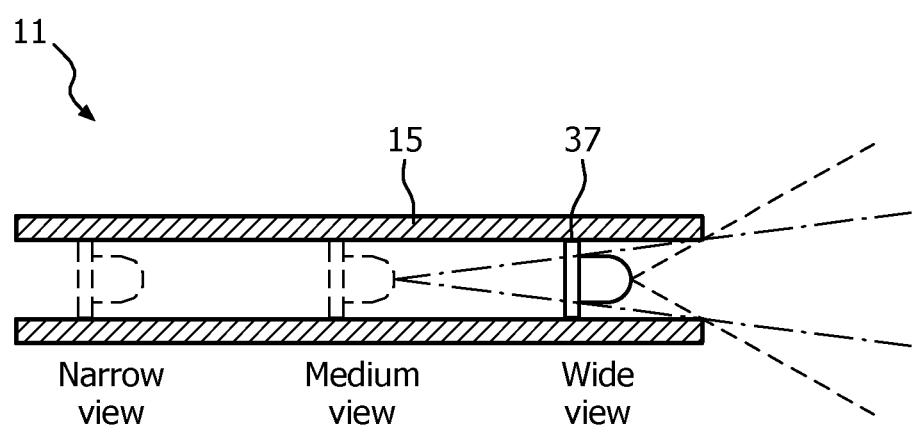
FIG. 7 shows a yet further embodiment of light selecting means with three pipes according to the invention.

A yet further embodiment of the lighting selecting means 12 of the present invention is shown in FIG. 7. Instead of having several pipes of different length as the embodiments from FIGS. 2 and 6, the light selecting means 11 of this embodiment has one lengthy pipe 15 with a photodiode 37 slide able arranged inside the pipe 15, thus allowing to adjust the angle of sensory view by sliding the photodiode 37 into the pipe 15 from left to right or viceversa. In FIG. 7, three exemplary positions of the photodiode 37 within the pipe 15 are shown: in the left position, the light selecting means 11 have a narrow view, in the medium position, they have a medium view, and in the right position, the view is wide.

FIG. 3 shows the light source selection device 10 with the light selections means 12 of FIG. 2, which form the optical part, shown in a cross sectional view and the further components of the electronic part as a block diagram. The electronic part of device 10 comprises a controller 42, which implements a photosensor output signal processing unit for processing the output signals of the three photodiodes 36, 38, and 40, to control a display 46 and buttons 48 as input means of the device 10. The controller 42 is further coupled to a RF, IR or UV unit 44 for wirelessly communicating with other devices, particularly directly with a selected device or with a control system such as the lighting system controller 50 shown in FIG. 1. As shown in FIG. 3, the device 10 may further comprise a laser pointer 50, which may assist a user of the device 10 in selecting a light source in that its laser beam is essentially parallel to the tunnels 14, 16, and 18.

Figure 4:
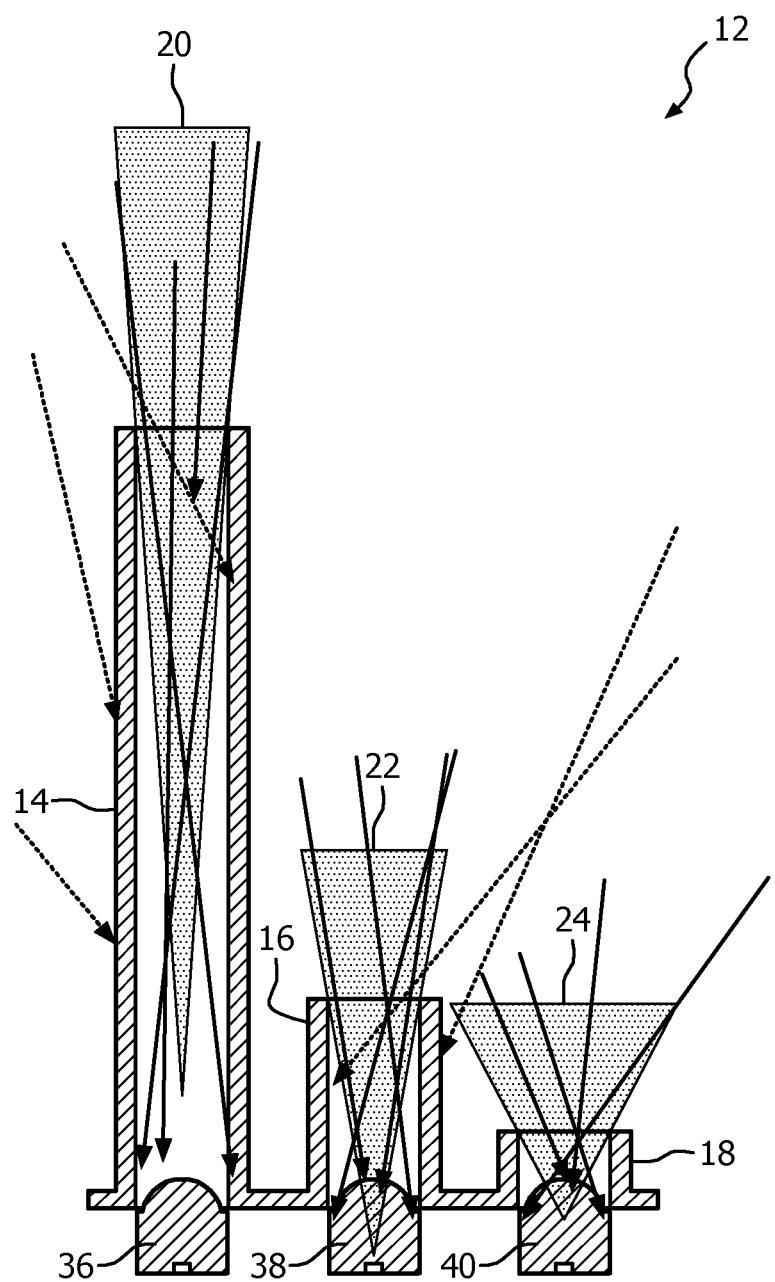
FIG. 4 shows a cross-sectional view of the light selection means of FIG. 1 and the sensoring of light incident on the pipes of the light selection means with photodiodes assigned to the pipes.

In FIG. 4, a cross-sectional view of the light selection means 12 with light incident on the pipes 14, 16, and 18 is shown. FIG. 4 particularly shows the effect of the material and the length of the pipes. Dashed arrows are light signals rays which are not able to reach the photosensors. Whole arrows show the light signal rays which are able to reach the photosensors for perception. The longer the pipe, the narrower it's angle of perception, thus the more sensitive this photo sensor is to the pointing accuracy. The detection ranges are shown as dark areas in FIG. 4. As can be seen in FIG. 4, the long pipe 14 has a small angle of detection, which results in a smaller field of view 20. The pipe 16 with a medium length has a medium angle of detection resulting in a medium field of view 22. Finally, the short pipe 18 has a wide angle of detection resulting in a large field of view 24. Depending on the field of view, the pipe 14 has high selection accuracy, while the short pipe 18 has low selection accuracy.

Figure 5:
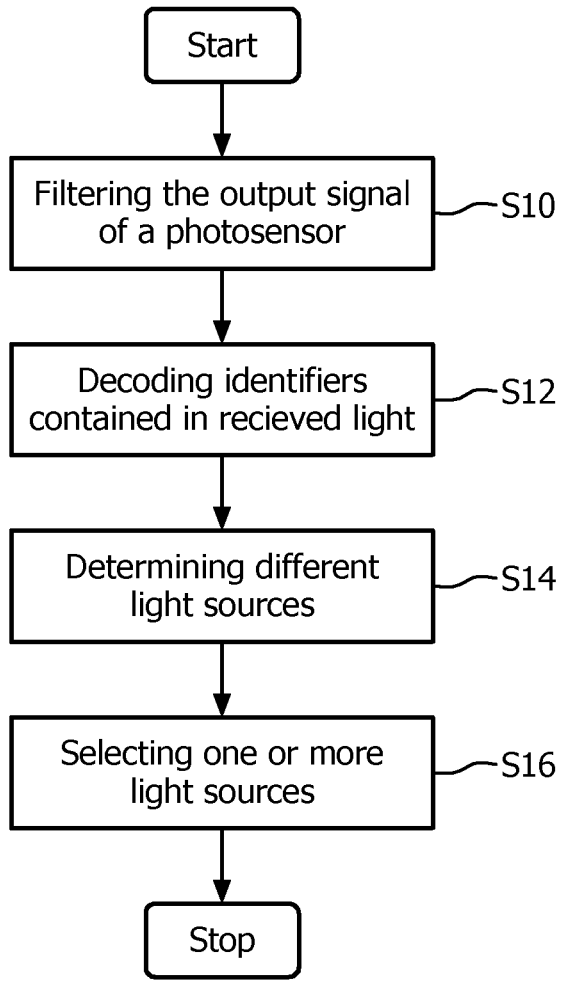
FIG. 5 shows a flowchart of an embodiment of an algorithm processing the photosensors output signals and selecting a light source.

Next, the selection algorithm as executed by the photosensor output signal processing unit implemented in the controller 42 is explained with regard to FIG. 5, which shows a flowchart of the algorithm. The controller 42 receives the output signals from the photodiodes 36, 38, and 40. In a first step S10, the output signals of the photodiodes are filtered in order to leave only the information relevant to identifying the light sources. Then, in a second step S12, any identifiers contained in the light received by the photodiodes 36, 38, and 40 and output as electrical signals for further processing are decoded. By means of the decoded identifiers, the different light sources can be determined in step S14. In the last step S16, one or more light sources are selected from the determined different light sources.

The step S16 for selecting light sources can be implemented according to various selection schemes, as will be described in the following. All embodiments of the selection step S16 are based on the signal strength of the light received by a photodiode.

The algorithm can in an embodiment for example create a list with the identifiers of the light sources and the signal strengths of the received lights. When more than one photodiode are provided for receiving light, the list may contain several entries of different signal strengths of the light received with different photodiodes from the same light source. Then the maximum of the determined signal strengths may be chosen for the light source. Finally, the algorithm may select from all signal strengths the largest one and select the light source, the received light of which generated the largest signal strength.

The algorithm may in another embodiment first process the output signal of one photodiode, for example the photodiode with the smallest field of view of all photosensors. The algorithm then determines the signal strengths of the light received from different light sources by the one photodiode. Further, the algorithm checks whether one light source is clearly the strongest among the determined signal strengths, for example if the light of any light source exceeds a threshold. If the algorithm determines a strongest light source, then it may select this light source. If not, the algorithm may check if there exists a clearly strongest light source in the output signal of another photodiode (for example the one with the next smallest field of view), and so on until the output signal of the last photodiode is analyzed for a clearly strongest light source.

The problem with this embodiment is that it is increasingly likely to get multiple coded light sources in side the larger view angle tubes (which leads to ambiguity). To get around this another embodiment of the algorithm can fit the detected strengths of each light source received with each of the three photosensors to a distribution (for example gaussian). In this way an estimate for the offset from the pointing direction and the width of the source can be reached. Even better these estimates are independent of the power so lamps which are closer are not unfairly biased. In this embodiment, the lamp with the smallest offset from the pointing direction is selected unless it is detected as a reflection (i.e. is diffuse—has a low brightness for its width).

A refinement to all of the above embodiments of the selection algorithms is that in the case where two or more light sources are approximately equally likely to be the pointed lamp it prompts the user to make an additional action to clarify.

In another embodiment of the invention, a single photodiode and tube may be provided. If the tube is very long, the photodiode will have a very small field of view. Hence, the likelihood of two or more strong coded light sources both lying in the field of view is small. Also as reflections are typically diffuse the total power picked up by the photodiode (integrated over its field of view) is still relatively small compared to having the peak of a direct code source (even with attenuation) in the field of view. Hence, an algorithm where the pointed lamp is simply the strongest received signal works in this case. The disadvantage of this method (which is overcome by the above described embodiment with three photodiodes) is that the user has to point very accurately (ensuring peak of pointed lamp falls in field of view) in order to make a correct selection.

Further refinements of the above described embodiments of the invention are
to use more than 3 photosensors and tubes to get a more reliable estimate of separation and width,
to use a single photosensor and a pipe with variable length and taking sample measurements at different length pipes.

The invention can be used for selecting devices, appliances or objects, to which a user points. In a further step, the invention may be used for a novel remote control concept, where a device, appliance or object to be controlled can be selected by selecting a light source of the device, appliance or object, which emits coded light. A typical application is the control of a complex lighting system with dozens of light sources, which may be individually selected for control. The invention allows creating for example an advanced remote control with IR source selectors to select lighting appliances, for example armatures with IR transmitters, for as well indoor and outdoor applications. Once a device of a lighting appliance is selected, variables of the selected device may be edited, for example functions such as "on/off", brightness, color, etc. of a lamp.

At least some of the functionality of the invention may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A light source selection device comprising:
a first tunnel having a first length determining a first field of view;
a second tunnel having a second length determining a second field of view, the second length being larger than the first length;
a third tunnel having a third length determining a third field of view, the third length being larger than the second length;
at least one photosensor assigned to each tunnel, wherein light from one or more light sources may be received by one or more of the assigned photosensors;
wherein each of said first, second, and third tunnels is configured to transmit light from one or more light sources incident on one end of the respective tunnel within the respective field of view to the at least one photosensor arranged on the other end of the respect tunnel, and further wherein the first, second, and third fields of view differ from each other in their view angles (α, β, μ); and a photosensor output signal processing unit being configured to select one or more light sources by processing the light received by each photosensor, wherein said photosensor output signal processing unit is configured to process the received light by: (i) determining different light sources through decoding identifiers contained in the received light, and (ii) selecting one or more light sources from the determined different light sources.

2. The device of claim 1, wherein the photosensor output signal processing unit is configured to select one or more light sources by:
determining the signal strength of the light received from the determined different light sources; and
selecting one or more light sources depending on the determined signal strengths.

3. The device of claim 2, wherein the photosensor output signal processing unit is configured to select one or more light sources with the largest signal strengths among the determined signal strengths.

4. The device of claim 1, wherein the photosensor output signal processing unit is configured to select a light source by:
determining the signal strength of the light received from a light source by a first one of the photosensors;
checking if the determined signal strength exceeds a threshold or has a threshold lead on other signal strengths; and
repeating the above steps for the next one of the photosensors if the determined signal strength does not exceed the threshold or selecting the light source if the determined signal strength exceeds the threshold.

5. The device of claim 1, wherein the photosensor output signal processing unit is configured to select a light source by:
determining the signal strength of the light received from a light source by each photosensor;
repeating the above step for each of the determined different light sources; and
selecting the light source for which the largest signal strength is determined.

6. The device of claim 1, wherein the photosensor output signal processing unit is configured to select a light source by:
determining the signal strength of the light received from a light source by each photosensor;
fitting the determined signal strengths to a distribution of a signal strength;
estimating the offset of the light source from a pointing direction of the device;
repeating the above steps for each of the determined different light sources; and
selecting the light source with the smallest estimated offset from the pointing direction.

7. The device of claim 1, further comprising one or more of the following:
a RF unit being configured to transmit an identification of a selected light source;
a RF unit being configured to request a light source to transmit its identification;
a display for displaying a selected light source;
buttons for selecting one of several selected light sources; and
a laser pointing unit for aiding a user in selecting a light source.

8. The means of claim 1, wherein a tunnel is formed by means of a light guiding core with a light absorbing casing or a light guide.

9. Light selecting means being configured for a device of claim 7, and implementing a field of view restriction for one or more of the photosensors by means of a carbon nanotube sheet.

10. A light source selection system comprising:
a light source selection device of claim 7: and
a lighting system controller configured to receive information related to a selected light source from the light source selection device and to control the selected light source.

11. A method for using a light source selection device of claim 7 for controlling appliances, devices and/or objects, each being configured to transmit a coded signal in the ultra violet, visible or infra red spectra.

12. A light source selection device comprising:
at least one photosensor with a field of view, wherein light from one or more light sources may be received by the within the field of view, and further wherein a field of view restriction is implemented for one or more of the at least one photosensors using a carbon nanotube sheet;
a photosensor output signal processing unit being configured to select one or more light sources by processing the light received by each photosensor, wherein said photosensor output signal processing unit is configured to process the received light by: (i) determining different light sources through decoding identifiers contained in the received light, and (ii) selecting one or more light sources from the determined different light sources;
a RF unit configured to transmit an identification of a selected light source;
a RF unit configured to request a light source to transmit its identification;
a display configured to display a selected light source;
buttons configured for selection one of several selected light sources; and
a laser pointing unit configured to aid a user in selecting a light source.

* * * * *